United States Patent
Feuser

(10) Patent No.: US 6,172,494 B1
(45) Date of Patent: Jan. 9, 2001

(54) CIRCUIT ARRANGEMENT FOR DELIVERING A SUPPLY CURRENT

(75) Inventor: Markus Feuser, Buchholz (DE)

(73) Assignee: U.S. Philips Corporation, New York, NY (US)

(*) Notice: Under 35 U.S.C. 154(b), the term of this patent shall be extended for 0 days.

(21) Appl. No.: 09/500,663

(22) Filed: Feb. 9, 2000

(30) Foreign Application Priority Data

Feb. 23, 1999 (DE) .............................................. 199 07 575

(51) Int. Cl.$^7$ ...................................................... G05F 1/40

(52) U.S. Cl. ............................................ 323/288; 323/282

(58) Field of Search ..................................... 323/271, 273, 323/275, 281, 282, 284, 285, 288

(56) References Cited

U.S. PATENT DOCUMENTS

| 5,315,219 | * | 5/1994 | Kishi | 318/254 |
| 5,783,933 | * | 7/1998 | Bailly | 323/282 |
| 5,828,208 | * | 10/1998 | Oku | 323/282 |
| 5,969,513 | * | 10/1999 | Clark | 323/282 |

* cited by examiner

Primary Examiner—Matthew Nguyen

(57) ABSTRACT

A circuit arrangement for delivering a supply current for an electronic circuit from a supply voltage source has a controllable current source arrangement which can be switched over so as to deliver a first and a second predetermined constant current. The second constant current is larger than the first constant current. An input of the controllable current source arrangement is connected to the supply voltage source and an output of the controllable current source arrangement is connected to an energy storage element and to the electronic circuit. The circuit arrangement further has a first reference voltage source for preparing a first and a second reference voltage. The second reference voltage is higher than the first reference voltage. The circuit arrangement still further has a comparison arrangement for comparing a supply voltage, produced in the electronic circuit and the energy storage element by the supply of the supply current, with the first and the second reference voltage and for switching over the current source arrangement to the first constant current when the supply voltage exceeds the second reference voltage and to the second constant current when the supply voltage is lower than the first reference voltage.

6 Claims, 1 Drawing Sheet

CIRCUIT ARRANGEMENT FOR DELIVERING A SUPPLY CURRENT

BACKGROUND OF THE INVENTION

1. Field of the Invention

The invention relates to a circuit arrangement for delivering a supply current.

2. Description of the Related Art

The term "Differential Power Analysis", abbreviated hereinafter as DPA, is used to denote a method whereby, via measurement of the supply current of an electronic circuit or by measurement of voltage dips in the supply voltage whereby the supply current is applied to the electronic circuit, in addition to measurement of input and output signals of the electronic circuit, to extract knowledge concerning the operations taking place in the electronic circuit. DPA has notably become known as an analysis method for the discovery of encrypted instructions or data in programmable integrated electronic circuits for identification devices. This could affect the security of credit cards, access control and the like.

SUMMARY OF THE INVENTION

It is an object of the invention to provide a circuit arrangement for delivering a supply current for an electronic circuit which precludes the extraction of information as regards the internal operations of the electronic circuit by measurement of the supply current or the supply voltage, thus preventing undesirable discovery of details of the electronic circuit by way of DPA means.

This object according to the invention is achieved by means of a circuit arrangement for delivering a supply current for an electronic circuit from a supply voltage source, which arrangement includes a controllable current source arrangement which can be switched over so as to deliver a first and a second predetermined constant current, the second constant current being larger than the first constant current, and whose input is connected to the supply voltage source while its output is connected to an energy storage element and the electronic circuit, and also includes a first reference voltage source for preparing a first and a second reference voltage, being higher than the first reference voltage, as well as a comparison arrangement for comparing a supply voltage, produced in the electronic circuit and the energy storage element by the supply of the supply current, with the first and the second reference voltage and for switching over the current source arrangement to the first constant current when the supply voltage exceeds the second reference voltage and to the second constant current when the supply voltage is lower than the first reference voltage.

The steps proposed by the invention render the supply current and the supply voltage for the electronic circuit independent of the processes taking place inside the electronic circuit so that the supply current and the supply voltage become useless as measured quantities that can be extracted by means of DPA. This effectively counters attacks on the electronic circuit by DPA. Moreover, the invention offers the advantage that the supply current can be adapted, within given limits, to the actual power requirements of the electronic circuit. According to the invention, the supply current is not constant during the entire operation of the electronic circuit, but is adapted to the actual power requirements of the electronic circuit, however, without surrendering information concerning the internal processes of the electronic circuit to the environment. On the other hand, however, the supply current can be reduced in the case of a lower power consumption of the electronic circuit and it need not always assume a value corresponding to the highest possible power requirements of the electronic circuit, i.e. the power requirements for that function of the electronic circuit for which the electronic circuit has the highest power consumption. As a result, the supplied power is more effectively used for the electronic circuit, however, without degrading the protection against attacks by the DPA in order to achieve such higher efficiency and improved economy.

The power requirements in an electronic circuit differ as a function of its construction, mode of operation or operating state. In electronic circuits constructed by means of CMOS components, operating in synchronism on the basis of a clock signal, the highest power requirements exist at an instant in time which is situated a short distance in time from the edges of the clock signal. Should, in relation to the other time intervals, a very strong rise of the power requirements occur at this instant, such power requirements can be met by the energy storage element. The supply of energy to the electronic circuit from the energy storage element bridges the time interval possibly required to switch over the current source arrangement should such switching-over be necessary in order to sustain an adequate supply of energy. This is notably the case when the increased power requirements persist in time. The comparison arrangement ensures that the values of the supply voltage applied to the electronic circuit always lie in the permissible voltage range between the first and the second reference voltage.

An attractive embodiment of the circuit arrangement according to the invention is characterized in that it includes a second reference voltage source for presenting a third reference voltage which is lower than the first reference voltage and represents a minimum value of the supply voltage for the specified operation of the electronic circuit, as well as a reset arrangement which is supplied with the third reference voltage and the supply voltage for the purpose of comparison and resets the electronic circuit to a basic state when the supply voltage is less than the third reference voltage.

Thus, in case the supply of the second constant current cannot adequately meet the power requirements of the electronic circuit, the reset arrangement resets the electronic circuit to its basic state in order to avoid incorrect operation.

A further embodiment of the circuit arrangement according to the invention includes a switch-over lead via which the current source arrangement is switched over directly by the electronic circuit. Notably in the case of executions of functions which are strictly specified in time in the electronic circuit a predictable increase of the power requirements can thus be provided by the comparison arrangement even before the switching over is initiated. This creates additional flexibility in the supply of power to the electronic circuit. It is thus notably possible to set the energy storage element timely to the best possible operating state before a function step takes place in the electronic circuit which involves a particularly high power consumption.

Predetermination of the direct switching over of the current source arrangement by a selectable function execution in the electronic circuit is particularly simple and effective when the electronic circuit is constructed as a programmable arrangement for electronic data processing involving switching-over instructions for the current source arrangement.

The circuit arrangement according to the invention can be used preferably for security and identification systems, particularly for systems involving chip cards or electronic labels. The circuit arrangement according to the invention is then particularly suitable for use in portable data carriers of such systems, i.e. in the chip cards or labels themselves.

BRIEF DESCRIPTION OF THE DRAWING

An embodiment of the invention is shown in the drawing and will be described in detail hereinafter.

DETAILED DESCRIPTION OF THE INVENTION

Figure 1:
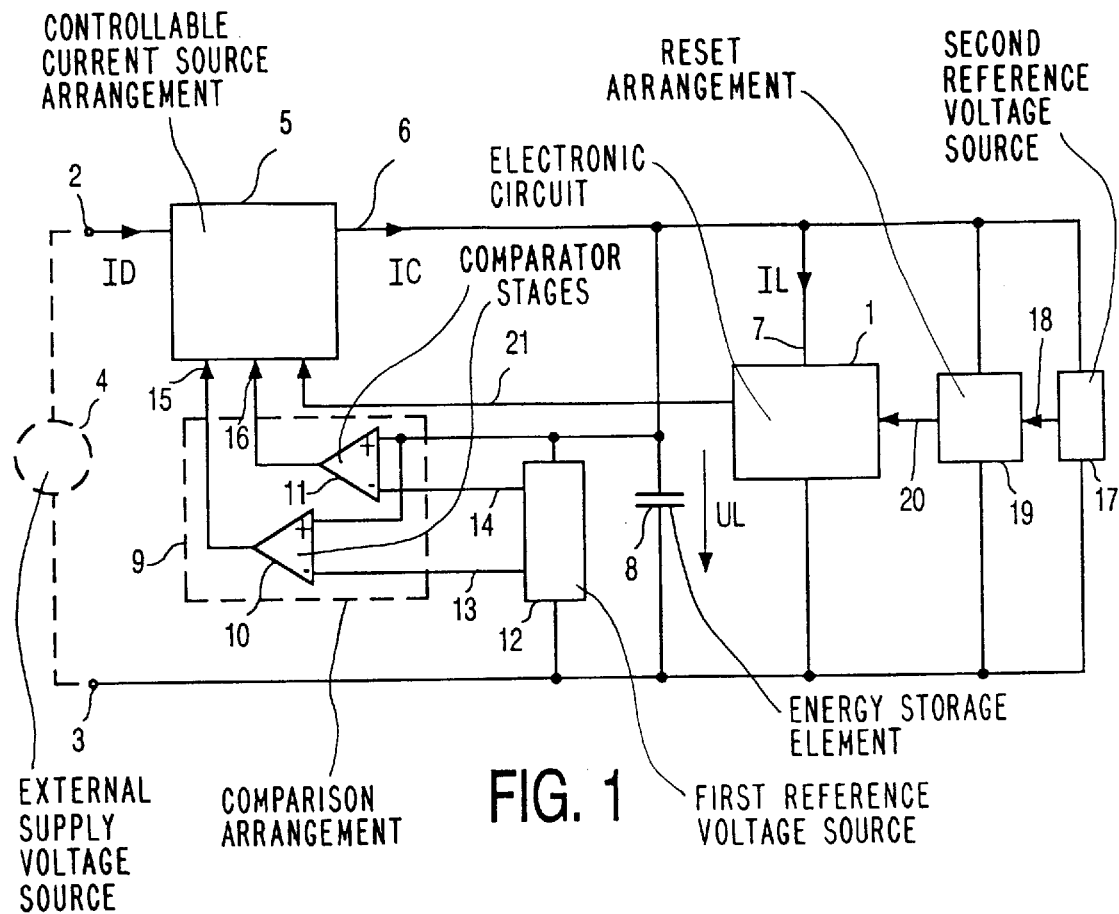
FIG. 1 shows a block diagram of an example of the construction of the circuit arrangement according to the invention for a portable data carrier, for example a chip card.

The circuit arrangement shown in FIG. 1 includes an electronic circuit 1 which is preferably constructed as an integrated, programmable arrangement for electronic data processing. The electronic circuit 1 is accommodated on a data carrier, notably a chip card, which can be connected, via a supply voltage source terminal 2 and a ground terminal 3, to an external supply voltage source 4 for delivering a supply current for the electronic circuit 1. A current ID is applied from the supply voltage source 4 to the circuit arrangement via the supply voltage source terminal 2. The supply voltage source terminal 2 at the same time constitutes an input of a controllable current source arrangement 5 which outputs a temporally constant current IC via an output 6, said current assuming the value of a first or a second predetermined constant current, depending on the switching state of the controllable current source arrangement 5.

The output 6 of the controllable current source arrangement 5 is connected to a supply voltage input 7 of the electronic circuit 1 as well as to a terminal of an energy storage element 8 which is constructed as a capacitor. From the constant current IC on the output 6 of the controllable current source arrangement 5 there is derived on the one hand a supply current IL for the supply voltage input 7 of the electronic circuit 1; on the other hand, the difference between the supply current IL and the current IC flows into or is extracted from the energy storage element 8. Consequently, a supply voltage UL is formed across the energy storage element 8, i.e. also between the supply voltage input 7 of the electronic circuit 1 and the ground terminal 3. The supply voltage UL across the energy storage element 8 or the electronic circuit 1 fluctuates in conformity with the fluctuations of the supply current UL which are caused by the functions executed in the electronic circuit 1.

The arrangement shown in FIG. 1 also includes a comparison arrangement 9 with two comparator stages 10, 11, the non-inverting inputs of which are connected to the output 6 of the controllable current source arrangement 5 and hence receive the supply voltage UL. A first reference voltage source, also being connected between the output 6 of the controllable current source arrangement 5 and the ground terminal 3 in the example shown in FIG. 1, and hence also being supplied with the supply voltage UL, is denoted by the reference numeral 12 and has a first reference voltage output 13 for supplying a first reference voltage as well as a second reference voltage output 14 for supplying a second reference voltage. The second reference voltage is higher than the first reference voltage. Both reference voltages constitute limit values for the values of the supply voltage UL permissible during operation of the electronic circuit 1. The first reference voltage output 13 is connected to an inverting input of the first comparator stage 10 of the comparison arrangement 9, whereas the second reference voltage output 14 is connected to an inverting input of the second comparator stage 11 of the comparison arrangement 9. The outputs of the comparator stages 10, 11 are connected to control inputs 15 and 16, respectively, of the controllable current source arrangement 5.

The first comparator stage 10 is thus arranged in such a manner that a change of the value of the switch-over signal present on the first control input 15 of the controllable current source arrangement 5 occurs when the value of the supply voltage UL or (for reasons of ease of extraction of the voltages) a predetermined fraction of the supply voltage UL drops below the value of the first reference voltage or increases beyond this value. Analogously, the value of the switch-over signal on the second control input 16 changes when the voltage value, used for comparison with the second reference voltage on the second reference voltage output 14 and derived from the supply voltage UL, increases beyond the second reference voltage or drops therebelow. The switch-over signals on the control inputs 15, 16 then control the controllable current source arrangement 5 in such a manner that the current IC on the output 6 corresponds to the first predetermined constant current when the second reference voltage is exceeded, and that the current IC corresponds to the second predetermined constant current if the voltage value drops below the first reference voltage. The supply voltage UL is thus always kept in the permissible range of values determined by the first and the second reference voltage.

FIG. 1 also shows a second reference voltage source 17 which is also fed by the supply voltage UL and, therefore, is inserted between the control output 6 of the controllable current source arrangement 5 and the ground terminal 3. This second reference voltage source 17 offers a third reference voltage whose value is less than the value of the first reference voltage and represents a minimum value of the supply voltage UL required for correct operation of the electronic circuit 1. The third reference voltage is applied from the second reference voltage source 17 to a reset arrangement 19 via a reference voltage output 18. The reset arrangement 19 also receives, via the output 6 of the controllable current source arrangement 5 and the ground terminal 3, the supply voltage UL in order to compare this voltage with the third reference voltage. When the supply voltage UL is less than the value of the third reference voltage, the electronic circuit 1 is reset to its basic state via a reset input 20. This prevents incorrect operation of the electronic circuit arrangement 1 due to an inadequate supply voltage UL.

The circuit arrangement of FIG. 1 also includes a switch-over lead 21 which extends from the electronic circuit 1 to a further control input of the controllable current source arrangement 5. The controllable current source arrangement 5 can be switched over directly by the electronic circuit 1 via the switch-over lead 21. Such switching-over may be pre-determined by a selectable function execution in the electronic circuit 1 and take place even before the occurrence of increased or reduced power requirements of the electronic circuit 1. As a result, the extraction of the supply current IL from the current IC or from the energy storage element 8 can be adapted to the expected changes of the power requirements of the electronic circuit 1 even before actuation of the comparison arrangement 9. This is simply and advantageously possible whenever the electronic circuit 1 is constructed as a programmable arrangement for electronic data processing and is intended to execute predetermined functions or instructions, the execution of which involves known power requirements.

Figure 2A:
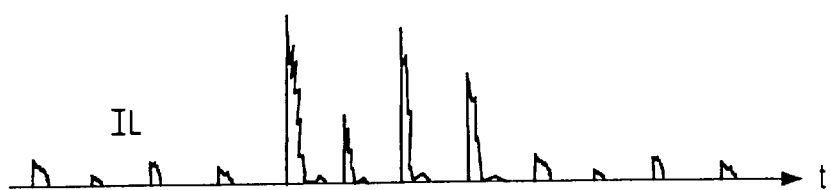
FIGS. 2A–2C show diagrams illustrating variations in time of various currents in the circuit arrangement shown in FIG. 1.

FIG. 2 shows an example of the variations as a function of time t of some currents appearing in FIG. 1. The temporal variation of the supply current IL on the supply voltage input 7 of the electronic circuit 1, shown by way of example in FIG. 2a), represents in a first time interval a current variation which is typical of an electronic circuit 1 which is composed of CMOS circuit elements and operates in synchronism with a clock signal in the case of a function execution which is considered as the normal mode of operation with a comparatively small number of switching events in each clock period. This time interval is succeeded by a second time interval with a large number of switching events per clock period, in this case being referred to as an the intensive mode of operation. Finally, there is another time interval with the normal mode of operation.

Figure 2B:
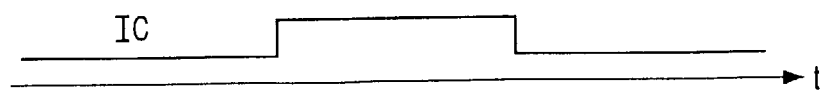
Figure 2C:
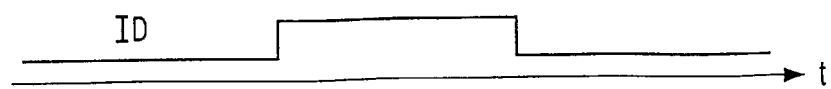

In conformity with the different power requirements of the electronic circuit 1 in the normal mode on the one hand and in the intensive mode on the other hand, the controllable current source arrangement 5 delivers a first predetermined constant current during the normal mode and a second predetermined constant current during the intensive mode. This is illustrated in FIG. 2b) which shows the current IC. The clock-dependent current peaks of the supply current IL no longer occur in the current IC. Only the normal mode and the intensive mode can still be distinguished on the basis of the different constant currents, however, without surrendering usable information as regards individual function executions in the electronic circuit. In order to realize such a temporal variation of the current IC, the controllable current source arrangement 5 derives from the supply voltage source 4, via the supply voltage source terminal 2, a current ID which varies accordingly as a function of time and is shown in FIG. 2c).

FIG. 2 shows notably a possibility for the operation of the switch-over lead 21. The transition between the predetermined constant currents in this case takes place already before the appearance of the first large current peak in the intensive mode. Conversely, the current IC is already switched back before the appearance of the first current peak of the normal mode. Depending on the proportioning of the energy storage element 8 in relation to the power requirements of the electronic circuit 1, and hence in relation to the required supply current IL, in the case of control via the comparison arrangement 9 the diagrams for the currents IC and ID will in principle be of an identical form, be it slightly shifted in time.

What is claimed is:

1. A circuit arrangement for delivering a supply current for an electronic circuit from a supply voltage source, which arrangement includes a controllable current source arrangement which can be switched over so as to deliver a first and a second predetermined constant current, the second constant current being larger than the first constant current, and whose input is connected to the supply voltage source while its output is connected to an energy storage element and the electronic circuit, and also includes a first reference voltage source for preparing a first and a second reference voltage, being higher than the first reference voltage, as well as a comparison arrangement for comparing a supply voltage, produced in the electronic circuit and the energy storage element by the supply of the supply current, with the first and the second reference voltage and for switching over the current source arrangement to the first constant current when the supply voltage exceeds the second reference voltage and to the second constant current when the supply voltage is lower than the first reference voltage.

2. A circuit arrangement as claimed in claim 1, characterized in that it includes a second reference voltage source for presenting a third reference voltage which is lower than the first reference voltage and represents a minimum value of the supply voltage for the specified operation of the electronic circuit, as well as a reset arrangement which is supplied with the third reference voltage and the supply voltage for the purpose of comparison and resets the electronic circuit to a basic state when the supply voltage is less than the third reference voltage.

3. A circuit arrangement as claimed in claim 1, characterized in that it includes a switch-over lead via which the current source arrangement is switched over directly by the electronic circuit.

4. A circuit arrangement as claimed in claim 3, characterized in that the direct switching-over is predetermined by a selectable function execution in the electronic circuit.

5. A circuit arrangement as claimed in claim 4, characterized in that the electronic circuit is constructed as a programmable arrangement for electronic data processing, and that the electronic data processing involves switch-over instructions for the current source arrangement.

6. A chip card, characterized in that it includes a circuit arrangement as claimed in claim 1.

* * * * *